US006713905B2

(12) United States Patent
Hirschburger et al.

(10) Patent No.: US 6,713,905 B2
(45) Date of Patent: Mar. 30, 2004

(54) ELECTRIC-MOTOR ROTARY POWER TOOL HAVING A LIGHT SOURCE WITH A SELF-GENERATING POWER SUPPLY

(75) Inventors: Wolfgang Hirschburger, Wilmette, IL (US); Allen M. Oles, Chicago, IL (US)

(73) Assignee: S-B Power Tool Company, Chicago, IL (US)

( * ) Notice: Subject to any disclaimer, the term of this patent is extended or adjusted under 35 U.S.C. 154(b) by 0 days.

(21) Appl. No.: 09/945,545

(22) Filed: Aug. 30, 2001

(65) Prior Publication Data

US 2003/0042803 A1 Mar. 6, 2003

(51) Int. Cl.[7] .................. H02K 37/00

(52) U.S. Cl. .................. 310/47; 310/50; 310/73; 362/192; 362/120

(58) Field of Search .................. 310/47, 50, 48, 310/73, 156.08–156.18; 362/192, 119, 120

(56) References Cited

U.S. PATENT DOCUMENTS

| | | | | |
|---|---|---|---|---|
| 2,213,724 A | * | 9/1940 | Vogel | 310/156.23 |
| 3,749,951 A | * | 7/1973 | Artin et al. | 310/73 |
| 4,298,910 A | * | 11/1981 | Price | 362/35 |
| 4,302,797 A | | 11/1981 | Cooper | 362/119 |
| 4,480,295 A | | 10/1984 | Shuster | 362/206 |
| 4,482,829 A | * | 11/1984 | Tardieu et al. | 310/105 |
| 4,486,176 A | * | 12/1984 | Tardieu et al. | 433/133 |
| 4,642,738 A | * | 2/1987 | Meller | 362/119 |
| 4,648,610 A | * | 3/1987 | Hegyi | 280/11.19 |
| 4,678,922 A | | 7/1987 | Leininger | 290/54 |
| 5,003,434 A | | 3/1991 | Gonser et al. | 362/32 |
| 5,267,129 A | | 11/1993 | Anderson | 362/96 |
| 5,525,842 A | | 6/1996 | Leininger | 290/54 |
| 5,793,130 A | | 8/1998 | Anderson | 310/50 |
| 5,982,059 A | | 11/1999 | Anderson | 310/50 |

FOREIGN PATENT DOCUMENTS

| | | |
|---|---|---|
| JP | 9-262744 | 10/1997 |
| JP | 10-225836 | 8/1998 |

* cited by examiner

*Primary Examiner*—Dang Le
(74) *Attorney, Agent, or Firm*—Greer, Burns & Crain, Ltd.

(57) ABSTRACT

A rotary power tool having a light source includes a housing, an electric motor provided in the housing and an elongated spindle engaged with and adapted to be rotatably driven by the motor. A rotatable holding assembly is attached to an end of the spindle and extends from a front end of the housing for holding a tool accessory. At least one magnet is adapted to be rotated by the spindle for producing a magnetic field, and a generally tubular sleeve is attached to the front end of the housing. At least one light emitting diode projects from a front end of the sleeve, generally between the inner and the outer surfaces of the sleeve. An inductive coil is also imbedded at least partially in the sleeve generally between the inner and the outer surfaces, proximate the magnet for generating an electric current from the magnetic field. Electrical conductors are also embedded and routed through the sleeve for supplying the electric current from the inductive coil to the light emitting diode.

33 Claims, 8 Drawing Sheets

ELECTRIC-MOTOR ROTARY POWER TOOL HAVING A LIGHT SOURCE WITH A SELF-GENERATING POWER SUPPLY

The present invention generally relates to rotary power tools, and more particularly to an electric-motor power tool having a light source with a self-generating power supply.

Hand-held multipurpose rotary tools are commonly known. These tools generally include an elongated spindle and an electric motor for rotating the spindle at high speeds. A holder is secured to an end of the spindle and is adapted to receive various accessories for striping, sanding, grinding, drilling, cutting and sharpening, for example.

Very often the rotary tools are used in places where adequate lighting is not always available. Consequently, the tool operator must work under poor lighting conditions, which may hinder him or her from satisfactorily completing the job, especially when the job requires precision and attention to detail. Brightening the work area with an additional light source such as a lamp or a flashlight can be an inconvenience and/or interfere with the job.

It may be possible to incorporate a light source directly into the rotary tools and have it connected to the same power source from which the motor of the tool is supplied. This would require substantially reconfiguring the tool to accommodate the added circuitry of the light source, which would increase the cost of tool manufacture. For rotary tools which are equipped with long and flexible extension attachments, having a light source built into the tool may not be helpful, since the light from the tool would not necessarily illuminate the area in which the work is being performed.

Accordingly, it is a primary objective of the present invention to provide an improved rotary power tool having a built-in light source.

Another object of the present invention is to provide an improved rotary power tool having a light source with a separate power supply from the power supply of the tool.

Still another object of the present invention is to provide such an improved rotary power tool having a light source with a power supply which induces current from a magnet when the magnet is rotated by the power tool.

The further object of the present invention is to provide such an improved rotary power tool having a light source which is incorporated into the end of an extension attachment.

Yet another object of the present invention is to provide such an improved rotary power tool having a light source that receives its power supply from a current generated from a magnet attached to the extension attachment of the power tool.

Other objects and advantages will become apparent upon reading the following detailed description, in conjunction with the attached drawings, in which.

DETAILED DESCRIPTION

Figure 1:
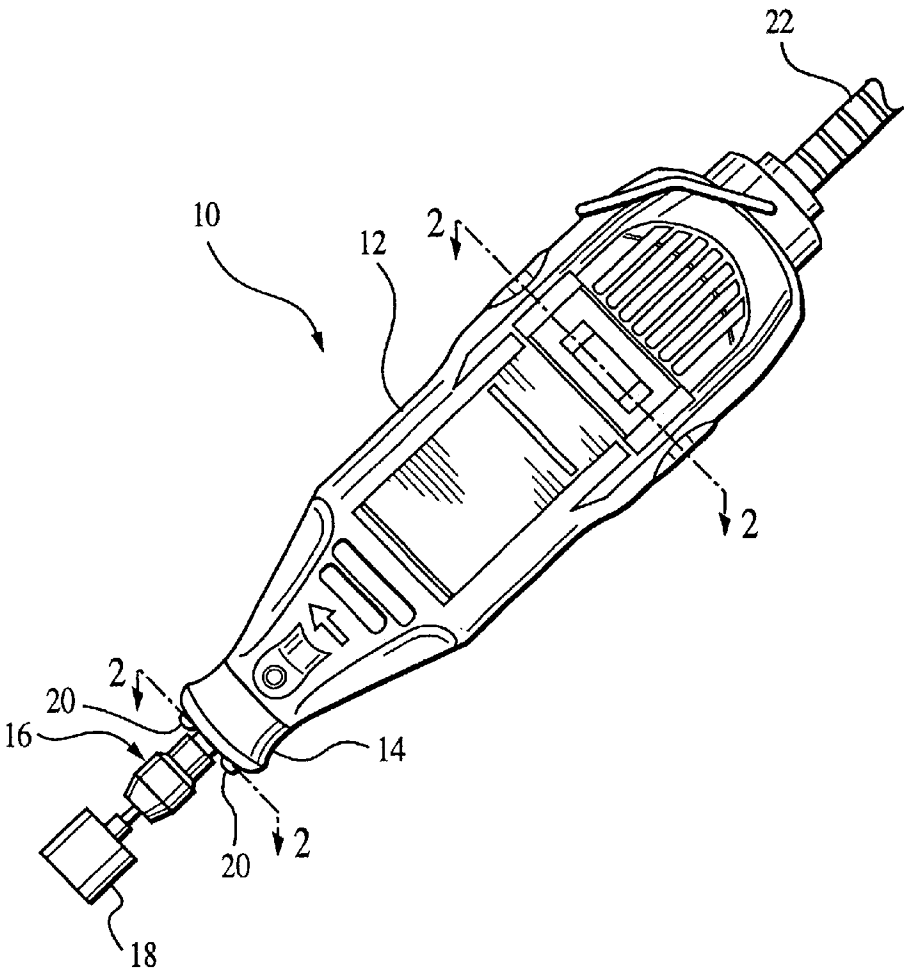
FIG. 1 is a perspective view of a rotary power tool embodying the present invention.

The present invention is directed to a multi-purpose rotary power tool which is adapted to receive and hold a number of different tool accessories for various tasks such as striping, sanding, grinding, cutting, drilling and sharpening, for example. The rotary tool includes a built-in light source located near the front of the tool. The power supply for the light source is independent from that of the rotary tool itself, and is generated by a coil of wire which is inductively coupled to a magnet provided in the tool. The magnet spins in conjunction with the spindle in the rotary tool, in close proximity to the stationary wire coil (also known as a choke or inductor in the art). As the magnet spins, the magnet's flux lines pass through the wire coil, inducing a current in the coil. As long as the light source is connected to the coil, current flows to the light source, which could be, for example, a light emitting diode (LED).

Broadly stated, the present invention is directed to a rotary power tool having a light source, and includes a housing, an electric motor provided in the housing and an elongated spindle engaged with and adapted to be rotatably driven by the motor. A rotatable holding assembly is attached to an end of the spindle and extends from a front end of the housing for holding a tool accessory. At least one magnet is adapted to be rotated by the spindle for producing a magnetic field, and a generally tubular sleeve is attached to the front end of the housing. At least one light emitting diode projects from a front end of the sleeve, generally between the inner and the outer surfaces of the sleeve. An inductive coil is also imbedded at least partially in the sleeve generally between the inner and the outer surfaces, proximate the magnet for generating an electric current from the magnetic field. Electrical conductors are also embedded and routed through the sleeve for supplying the electric current from the inductive coil to the light emitting diode.

The invention is also directed to a light source apparatus for an electric-motor rotary power tool having a rotatable tool holder assembly and equipped to receive an accessory attachment. The light source apparuatus includes a magnet constructed and adapted to be removably secured to the rotatable tool holder assembly, and a generally tubular sleeve which is configured and adapted to be removably attached to a portion of the power tool configured for receiving the accessory attachment. A current generating device is at least partially imbedded in the sleeve generally between the inner and the outer surfaces of the sleeve, and positioned proximate the magnet when the sleeve is attached to the power tool, for generating an electric current from a magnetic field created by the magnet when the power tool is operated. Lighting devices project from a front end of the sleeve and is adapted to illuminate when supplied with the electric current from the current generating device. Electrical conductors routed through the sleeve between the inner and the outer surfaces supply the electric current from the current generating device to the lighting device.

Turning now to FIG. 1, the rotary power tool of the present invention is indicated generally at 10 and includes a housing 12, a light source attachment 14, a tool accessory holder assembly 16 and a tool accessory 18. A pair of light emitting diodes (LEDs) 20 are included in the light source attachment 14 for illuminating the area surrounding the tool accessory 18. The rotary tool 10 is AC powered as indicated by a power cord 22. However, it may also be battery operated. The tool accessory 18 shown in FIG. 1 is only one example, and any number of known tool accessories can be used in its place.

Figure 2:
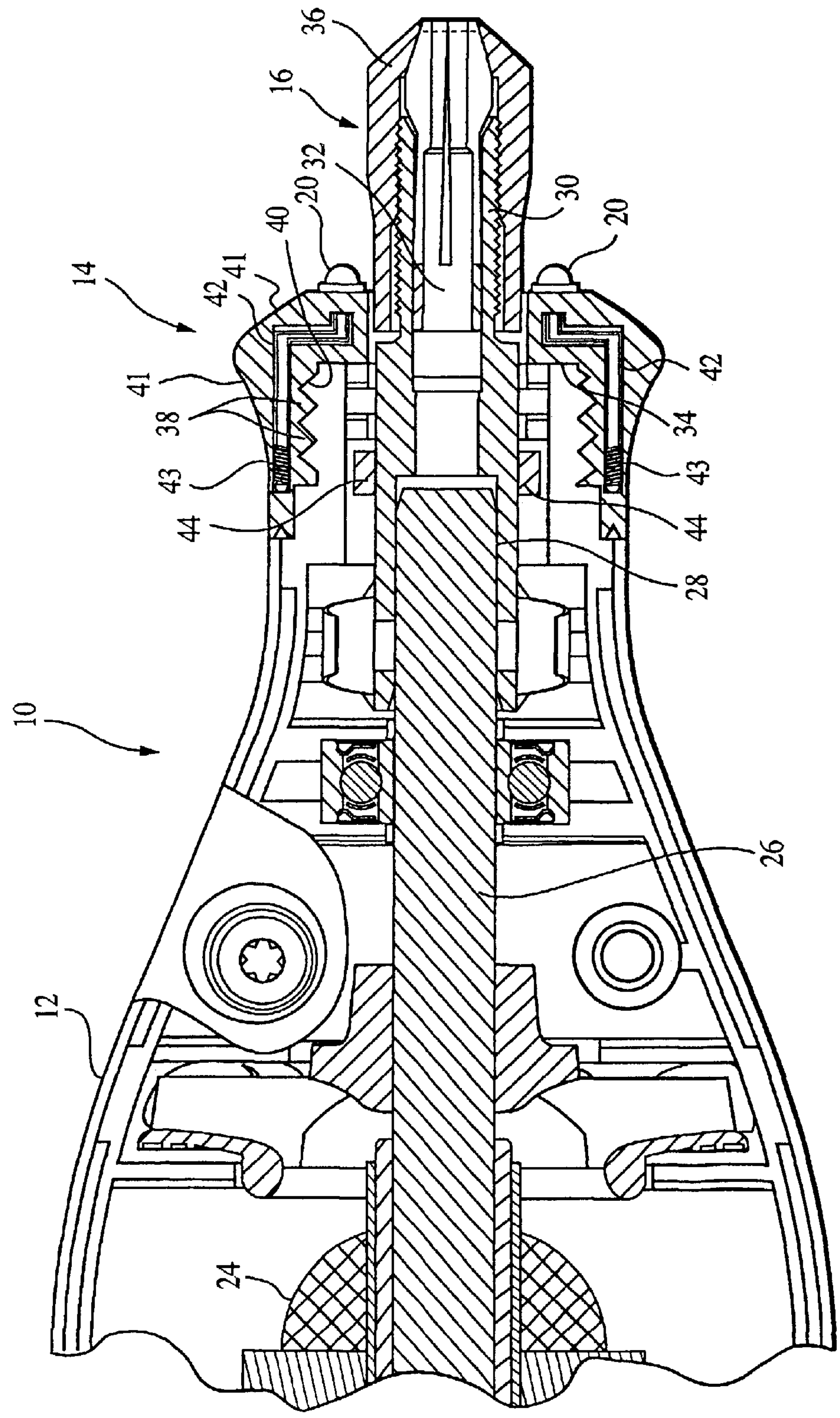
FIG. 2 is a sectional view of the area indicated by lines 2—2 of the rotary power tool shown in FIG. 1.

Turning to FIG. 2, the rotary tool 10 further includes an electric motor 24 (AC or battery powered) for rotating a shaft or spindle 26 about its longitudinal axis. The tool accessory holder assembly 16 includes a hollow, generally cylindrical base portion 28 which slips over the end of the spindle 26 opposite the motor 24 to securely mount the accessory holder assembly onto the spindle. A threaded head portion 30 extends from the base portion 28. A collet 32 is inserted into the hollow of the head portion 30, and a collet nut 36 is threaded onto the head portion 30 to enable the collet 32 to securely grab the tool accessory 18 inserted into the collet in a conventionally known manner.

A front end 34 of the housing 12 is threaded to receive various attachments that are constructed and adapted to be used with the rotary power tool 10, for example, a router attachment, a cutting attachment, a sharpening attachment, an extension attachment, etc. In accordance with one embodiment of the present invention, the light source attachment 14 is likewise constructed and adapted to be threaded onto attachment threads 38 at the front end 34 of the housing 12.

The light source attachment 14 includes a substantially tubular sleeve 39 having an inner circumferential surface 40 and an outer circumstantial surface 41. The inner circumferential surface 40 is threaded to cooperatively receive the threaded front end 34 of the housing 12. Each of the two LEDs 20 are imbedded in the sleeve 39 generally between the inner and the outer circumferential surfaces 40, 41, and projects from the front end of the sleeve 39 towards the tool accessory 18 (shown in FIG. 1), so as to illuminate the intended work area. The LEDs 20 are connected to a pair of wire conductors 42, which are also connected to a coil of wire or inductive coil 43 to complete an electrical circuit. The wire conductors 42 and the inductive coils 43 are provided within the thickness of the sleeve 39 and generally from the front to the back. In other words, the LEDs 20, the inductive coils 43 and the wire conductors are embedded in the sleeve 39 generally between the inner and the outer surfaces 40, 41, to form a single integrated piece, which simplifies implementation with the power tool 10.

A magnet ring 44 with at least two poles is secured to the base portion 28 of the tool accessory holder assembly 16 proximate the inductive coils 43, and rotates synchronously with the base portion 28 and the spindle 26 when the rotary tool 10 is operated. Those skilled in the art will recognize that instead of a ring, the magnet 44 can also be one or more individual magnets attached along the diameter of the base portion 28.

In the preferred embodiment, the sleeve 39 is formed from an easily moldable, nonelectrically conductive plastic or like material, and the LEDs 20 are Infineon Technologies Hyper-Bright LEDs. However, other light sources are contemplated, such as super bright white LEDs and incandescent light bulbs. Moreover, the light source attachment 14 may include only one LED 20, or more than two. The preferred inductive coil 42 is a Siemens B82144-A2107-J. However, many other similar inductive coils are contemplated.

Figure 3:
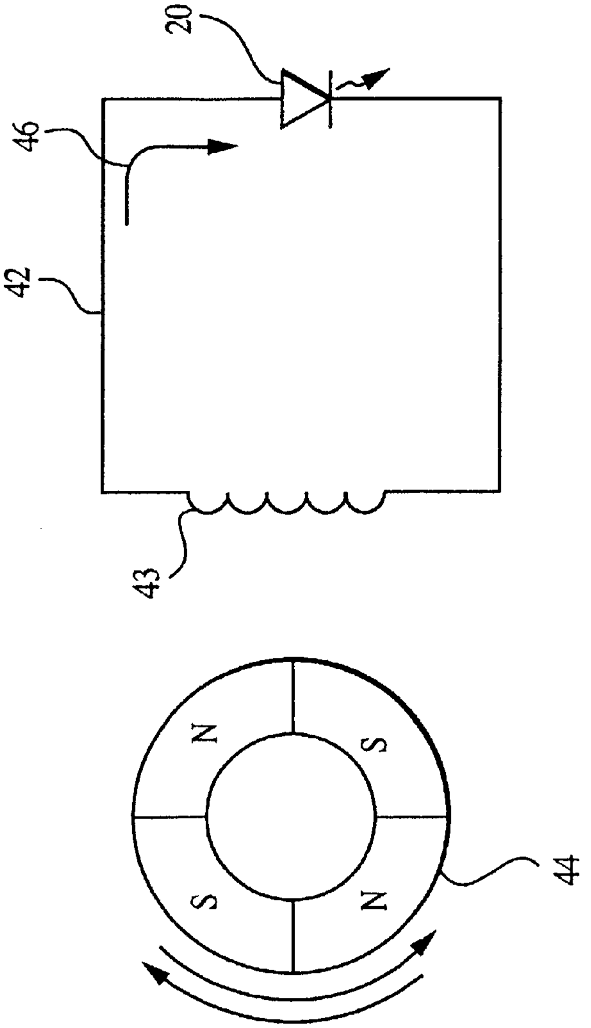
FIG. 3 is circuit diagram of a light source in accordance with the present invention.

FIG. 3 depicts an electrical circuit representation of the light source attachment 14 of the present invention. In operation, as the magnet ring 44 is rotated about the longitudinal axis of the spindle 26, either in a clockwise or a counterclockwise direction, electric current is induced in the coil 43 and supplied to the LED 20. The current causes the LED 20 to illuminate each half cycle when the LED is forward biased, as shown by an arrow 46. In FIG. 3, the magnet ring 44 is shown to have four poles. It should be understood however that magnetic ring 44 may have two or more poles, depending on the required characteristics in the final configuration of each different application.

Figure 4:
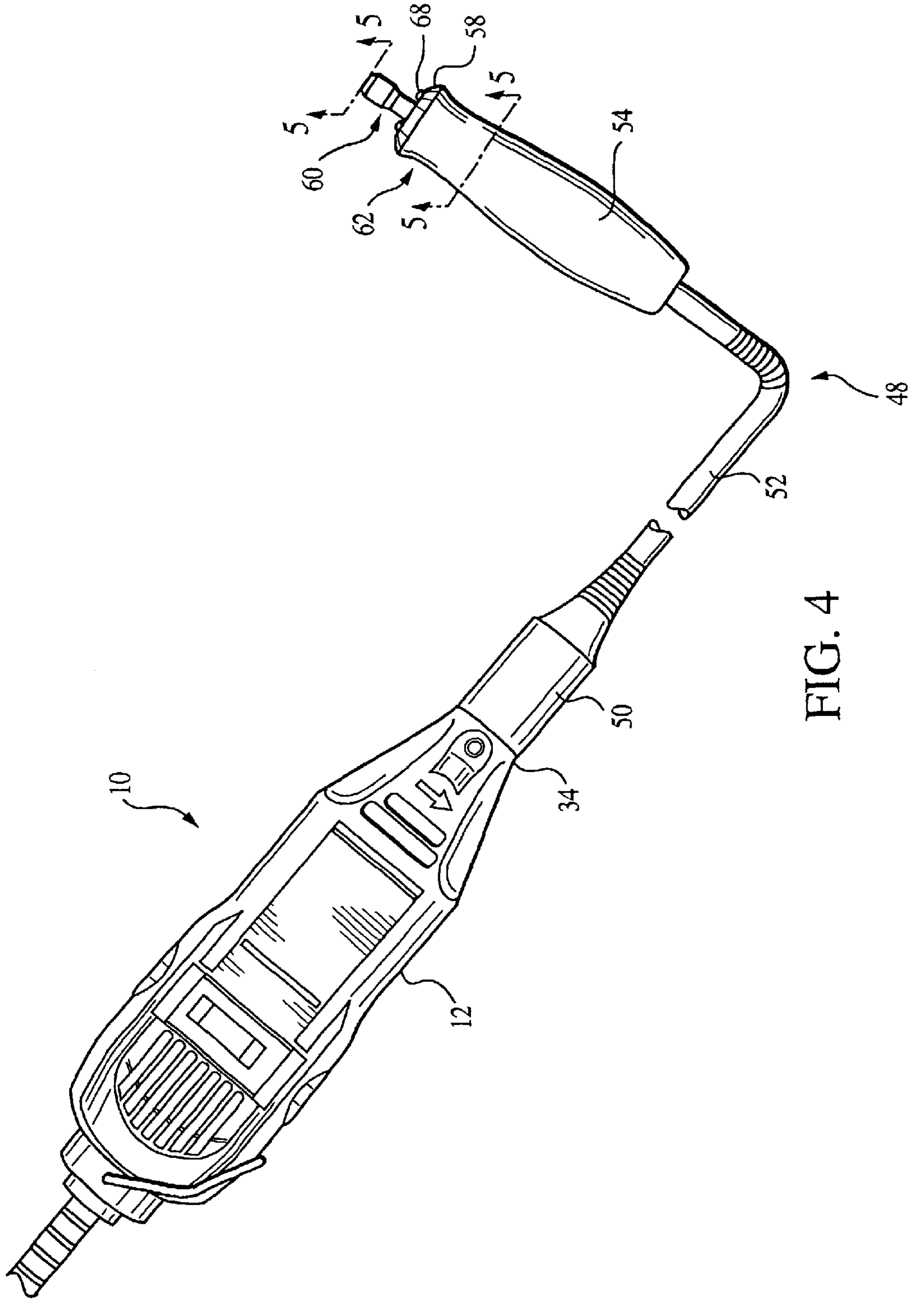
FIG. 4 is a perspective view of a rotary power tool with an extension attachment embodying the present invention.

Turning now to FIG. 4, the power tool 10 is shown with an extension attachment 48 connected to the front end 34 of the housing 12. The extension attachment 48 allows the user to reach into places not easily accessible by the tool 10 itself. Included in the extension attachment 48 are a connection portion 50, an extension portion 52, and a handpiece portion 54. A flexible shaft 56 (shown in FIG. 5) is routed coaxially and along the length of the extension attachment 48. The extension attachment 48 connects to the tool 10 at the connection portion 50, which is constructed and adapted to be threaded onto the attachment threads 38 in the housing 12 (best shown in FIG. 2). When the extension attachment 48 is connected to the tool 10, the flexible shaft 56 transfers the rotation of the spindle 26 in the power tool 10 (shown in FIG. 2) to an accessory holder assembly 60 at a front end 58 of the handpiece portion 54.

Figure 5:
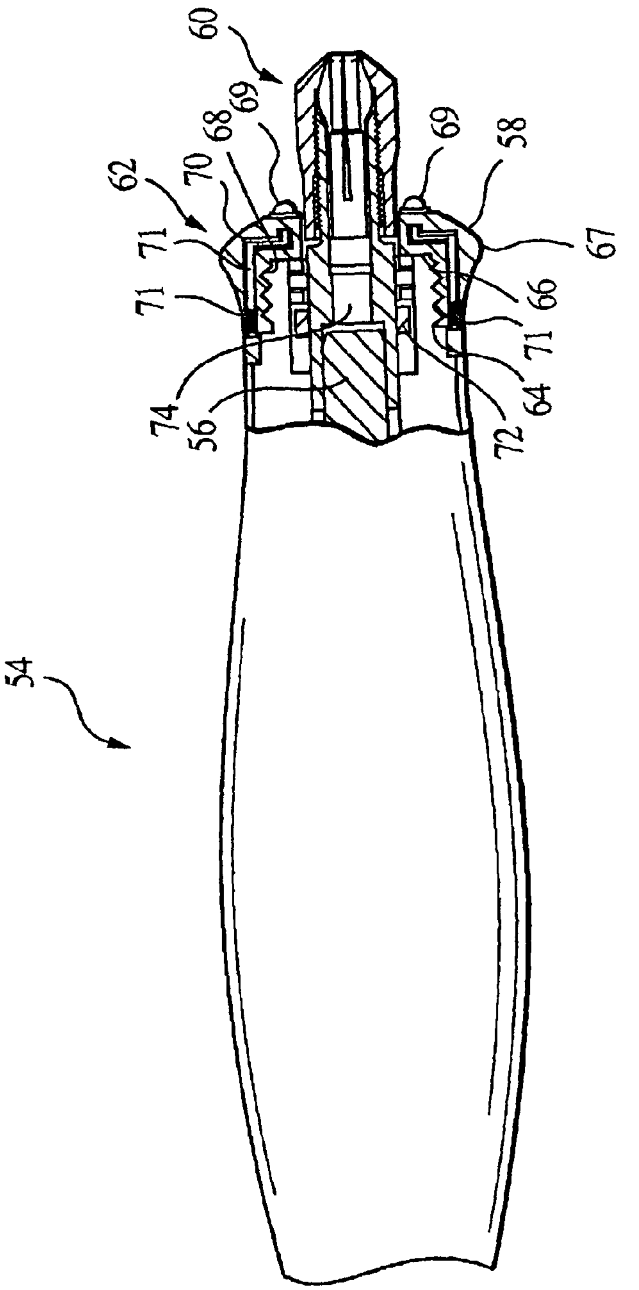
FIG. 5 is a sectional view of the area indicated by lines 5—5 of a light source attachment shown in FIG. 4.

Referring to FIG. 5, the handpiece portion 54 is shown, and includes the accessory holder assembly 60 and a light source attachment 62 which are constructed similarly to the accessory holder assembly 16 and the light source attachment 14 shown in FIG. 2. The accessory holder assembly 60 is configured and adapted to be attached to the flexible shaft 56, and the light source attachment 62 is configured and adapted to be screwed onto a threaded portion 64 formed at the front end 66 of the handpiece portion 54. The light source attachment 62 includes (similar to the light source attachment 14 described above) a generally tubular sleeve 67 which is threaded on an inner surface 68 to cooperatively screw onto the threaded portion 64 of the hand piece portion 54. A pair of LEDs 69 project from the sleeve 67 near the accessory holder assembly 60, and are at least partially imbedded in the sleeve 67 between the inner surface 68 and an outer surface 70. Each LED 69 is electrically connected to an inductive coil 71 formed in the the sleeve 67 between the inner and the outer surfaces. When the light source attachment 62 is attached to the threaded portion 64, the inductive coils 71 become positioned proximate a magnet 72, which is fixed to a base 74 of the accessory holder assembly 60.

Similar to the description given above with respect to the LEDs 20, the LEDs 69 are illuminated when the rotary tool 10 is operated and the rotation of the spindle 26 in the rotary tool is transferred to the flexible shaft 56, thereby rotating the magnet ring 72. The rotating magnet ring 72 induces a current in the coils 71, which is supplied to the LEDs 69. This arrangement allows the light from the LEDs 69 to be focused in the area front of the accessory holder assembly 60, where the light is most desirable.

Figure 7:
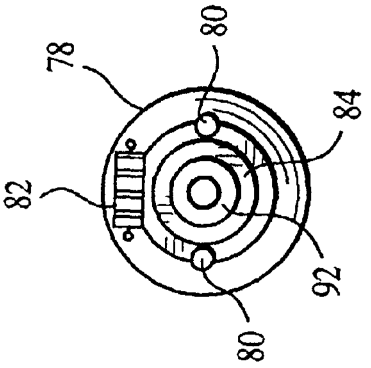
FIG. 7 is a front view of the light source attachment of FIG. 6.
Figure 6:
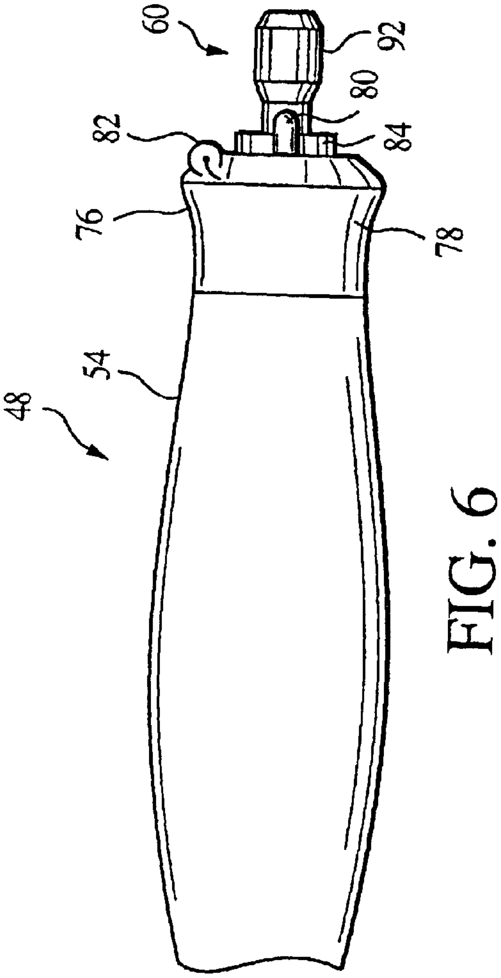
FIG. 6 is a side view of an alternate embodiment of the light source attachment in accordance with the invention.
Figure 8:
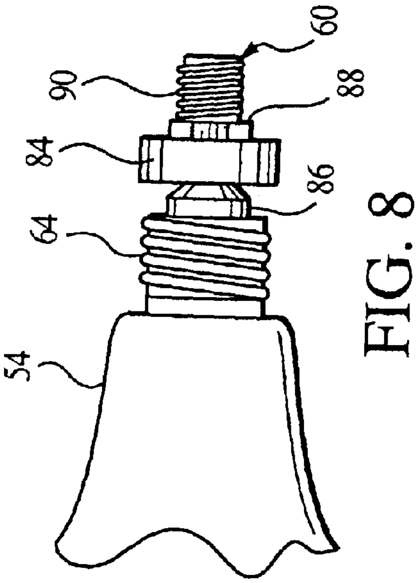
FIG. 8 is a side view of the light source attachment of FIG. 6, with parts removed for clarity.

Turning now to FIGS. 6–8 and in accordance with another embodiment of the present invention, a light source attachment 76 for the extension attachment 48 includes a generally tubular sleeve 78 that is constructed and adapted to be screwed onto the threaded portion 64 formed at the front end 66 of the handpiece portion 54 (best shown in FIG. 7). A pair of LEDs 80 project from the sleeve 78 near the accessory holder assembly 60 and are connected in parallel with an inductive coil 82, which is also partially imbedded in the sleeve 78 near the accessory holder assembly. The wires connecting the LEDs 80 with the inductive coil 82 are also imbedded within the sleeve 78. As in the light source attachments 14 and 16 described above, the LEDs 80, the inductive coil 82 and the wires that connect them are at least partially imbedded in an easily moldable plastic type material for ease of manufacture and implementation with the power tool 10 or the extension attachment 48.

For generating current in the inductive coil 82, a magnet ring 84 is slipped onto the base portion 86 of the accessory holder assembly 60 that is outside the front end 58 of the hand piece portion 54, and secured by a jam nut 88, which screws onto a threaded head portion 90 of the accessory holder assembly (best shown in FIG. 8). The magnetic ring 84 may also be secured by a collet nut 92 (best shown in FIG. 6) instead of the jam nut 88. This arrangement allows the light source attachment 76 to be easily incorporated into the existing extension attachment 48 by the tool operator, without the needs to retrofit the extension attachment at the factory or by a technician.

Figure 9:
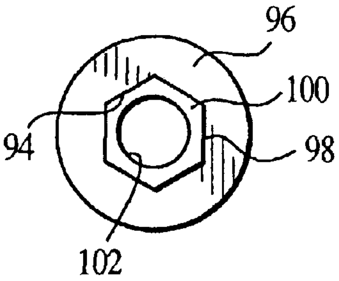
FIG. 9 is a plan view of an alternate embodiment of a magnet for generating magnetic flux.
Figure 10:
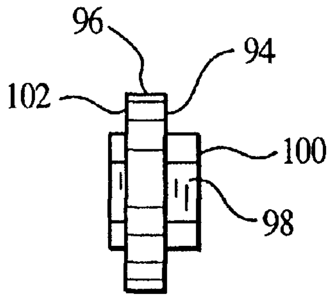
FIG. 10 is a side view of the magnet shown in FIG. 9.

As an alternative to the magnet ring 84/jam nut 88 arrangement described above, and referring to FIGS. 9 and 10, an inside opening 94 of a generally annular magnet 96 is constructed and configured to matingly attach to an outer hexagonal surface 98 of a nut 100. The inner opening 102 of the nut 100 is constructed and adapted to be threaded onto the head portion 90 of the accessory holder assembly 60 and tightened against the base portion 86. The nut 100 extends slightly beyond an inner surface 102 of the magnet 96 so as to prevent the magnet, which is relatively brittle, from coming in contact with the base portion 86. The nut 100 is also configured to extend sufficiently beyond an outer surface 104 of the magnet 96 to enable a tool to tighten or loosen the nut against or from the base portion 86 of the accessory holder assembly 60. Those of ordinary skill in the art will recognize that the outer surface 98 of the nut 100 can have shapes other than hexagonal that allow the nut to be tightened and loosened by a suitable tool.

The light source attachment 76 is also adapted to be operatively connected directly to the rotary tool 10. In this case, the sleeve 78 would be screwed onto the threads 38 in the housing 12, and the magnet ring 84 would be slipped onto the part of the base portion 28 that extends outside the front end 34 of the housing 12 (best shown in FIG. 2). The magnet ring 84 can either be secured by the jam nut 88 or the collet nut 36. The magnet 96/nut 100 arrangement is also adapted to be secured directly to the rotary tool 10. The magnet 96 would be secured onto to the base portion 28 by the threaded inner is opening 102 of the nut 100. When the sleeve 78 and the magnet ring 84 (or the magnet 96) is secured onto either the handpiece portion 54 or the rotary tool 10 itself, the inductive coil 82 and the magnet ring 84 are positioned proximate each other as shown in FIGS. 6 and 7.

Figure 12:
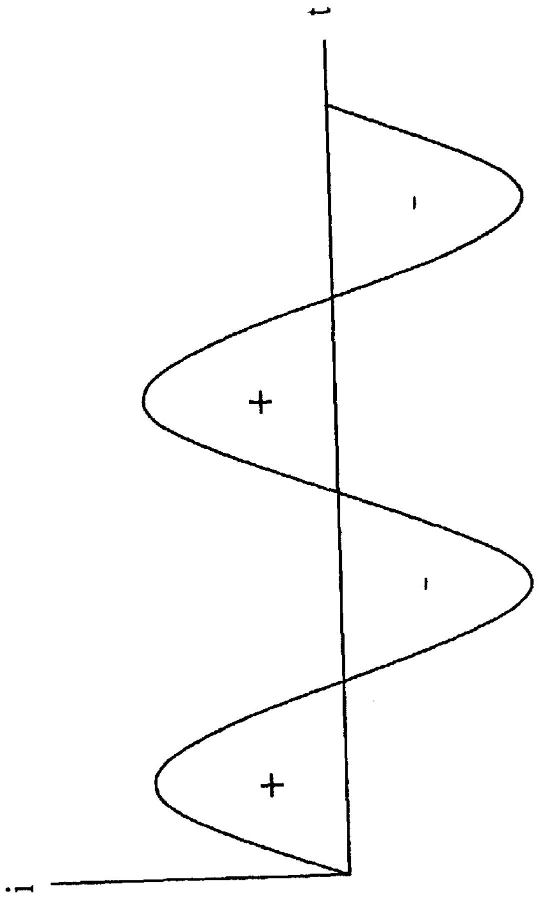
Figure 11:
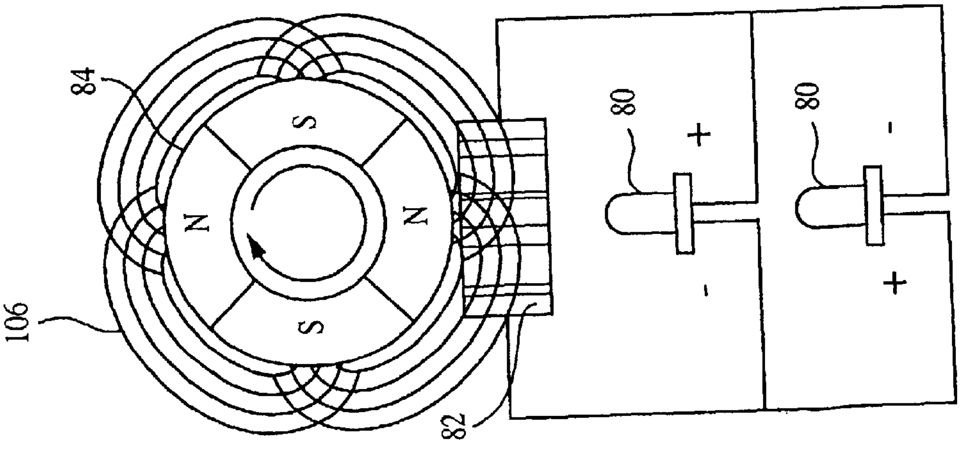
FIG. 11 is a circuit diagram representation of the light source attachment shown in FIG. 6; and, FIG. 12 is a waveform of current produced in the light source attachment of FIG. 6.

As shown in FIG. 11, the magnet ring 84 (or the magnet 96) preferably has 4 poles, and accordingly, flux lines 106 extending from the North to South poles. When the magnet ring 84 (or the magnet 96) spins in close proximity to the inductive coil 82, current is induced in the inductive coil as the flux lines 106 pass alternately through it. As the poles pass by the inductive coil 82, they generate a positive or negative current in the inductive coil, depending on the pole which is in proximity. The current waveform shown in FIG. 12 is the result of this process. The two LEDs 80 are connected so that their polarities are opposite, and since each LED 80 allows current to flow in only one direction, they switch on and off alternately. As long as the frequency of the switching is greater than that which the human eye can detect, each LED 80 will appear to be on constantly when the tool 10 is being operated. This frequency is controlled by the number of magnetic pole pairs and the frequency at which they pass by the inductive coil 82. Accordingly, the rotational speed of the tool 10, and thus, the magnetic ring 84 (or the magnet 96) controls the frequency.

From the foregoing description, it should be understood that an improved electric-motor rotary power tool has been shown and described which has many desirable attributes and advantages. It is provided with a light source which illuminates the area where the tool is intended to be used. The light source is supplied with a current which is generated from the rotation of the spindle of the tool, and therefore, does not require tapping into the power source of the tool itself. This simplifies the circuitry within the tool and does not drain the power source of the battery operated power tools.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A rotary power tool having a light source, comprising:

a housing;

an electric motor provided in said housing;

an elongated spindle engaged with and adapted to be rotatably driven by said motor;

a rotatable holding assembly located at an end of said spindle and extending from a front end of said housing for holding a tool accessory;

at least one magnet adapted to be rotated by said spindle for producing an alternating magnetic field;

a generally tubular electrically nonconductive sleeve removably attached to said front end of said housing, and having inner and outer surfaces;

light generating means at least partially embedded in said sleeve between said inner and said outer surfaces at a front end of said sleeve;

means imbedded at least partially in said sleeve generally between said inner and said outer surfaces, proximate said magnet for generating an electric current from said magnetic field; and, electrical conductors routed through said sleeve between said inner and said outer surfaces for supplying said electric current from said current generating means to said lighting means.

2. The power tool as defined in claim 1 wherein said magnet is secured to a part of said holding assembly which is inside said housing, and adapted to induce said electric current in said electric current generating means when said holding assembly is rotated by said spindle.

3. The power tool as defined in claim 2 wherein said magnet has at least two magnetic poles.

4. The power tool as defined in claim 1 wherein said magnet is substantially in a shape of a ring.

5. The power tool as defined in claim 4 wherein said magnet is secured to said holding assembly by a nut.

6. The power tool as defined in claim 4 wherein said magnet is secured to said holding assembly by a collet nut of said rotatable holding assembly for holding said tool accessory.

7. The power tool as defined in 4 wherein an inner opening of said magnet is matingly attached to an outer surface of a nut that has an inner surface which is configured and adapted to be threadably secured to said holding assembly.

8. The power tool as defined in claim 7 wherein said nut extends beyond said magnet in an axial direction of said magnet.

9. The power tool as defined in claim 1 wherein said electric current generating means is an inductive coil.

10. The power tool as defined in claim 1 wherein said lighting means is at least one light emitting diode (LED).

11. The power tool as defined in claim 1 wherein said tool is adapted to receive power from an AC power source for supplying power to said electric motor.

12. The power tool as defined in claim 1 further including a DC power source for supplying power to said electric motor.

13. A light source apparatus for an electric-motor rotary power tool having a rotatable tool holder assembly and equipped to receive an accessory attachment, said apparatus comprising:

a magnet constructed and adapted to be removably secured to the rotatable tool holder assembly;

a generally tubular electrically nonconductive sleeve configured and adapted to be removably attached to a portion of the power tool configured for receiving the accessory attachment, said sleeve having inner and outer surfaces;

current generating means at least partially imbedded in said sleeve generally between said inner and said outer surface and positioned proximate said magnet when said sleeve is attached to the power tool, for generating an electric current from an alternating magnetic field created by said magnet when the power tool is operated;

light generating means at least partially embedded in said sleeve between said inner and said outer surfaces at a front end of said sleeve, and being adapted to illuminate when supplied with said electric current from said current generating means; and, electrical conductors routed through said sleeve between said inner and said outer surfaces for supplying said electric current from said current generating means to said lighting means.

14. The apparatus as defined in claim 13 wherein said current generating means is positioned at said front end of said sleeve proximate said magnet.

15. The apparatus as defined in claim 14 wherein said magnet is adapted to be removably secured by the tool holder assembly and positioned on a portion of the tool holder assembly which extends outside a housing of the power tool.

16. The apparatus as defined in claim 15 wherein said magnet is substantially in a shape of a ring.

17. The power tool as defined in claim 16 wherein said magnet is secured to said holder assembly by a nut.

18. The power tool as defined in claim 16 wherein said magnet is secured to said holder assembly by a collet nut of said rotatable holder assembly for holding a tool accessory.

19. The power tool as defined in claim 16 wherein an inner opening of said magnet is matingly attached to an outer surface of a nut that has an inner surface which is configured and adapted to be threadably secured to said holding assembly.

20. The power tool as defined in claim 19 wherein said nut extends beyond said magnet in an axial direction of said magnet.

21. The apparatus as defined in claim 16 wherein said magnet has at least two magnetic poles.

22. The apparatus as defined in claim 13 wherein said current generating means is an inductive coil.

23. The apparatus as defined in claim 13 wherein said lighting means is at least one light emitting diode (LED).

24. An extension attachment adapted to be removably connected to a rotary power tool and having a light source and a tool bolder, said attachment comprising:

a connection portion constructed and adapted to be connected to the rotary power tool;

a substantially flexible extension portion extending from said connection portion;

a hand piece portion extending from said extension portion;

a flexible shaft disposed coaxially with said connection, said extension and said hand piece portions, the rotatable tool holder being attached to an end of said shaft in said hand piece portion and extending outside of said handpiece portion for holding a tool;

a magnet adapted to be attached to the tool holder and rotated by said shaft for producing an alternating magnetic field;

a generally tubular electrically nonconductive sleeve removably attached to said front end of said hand piece portion, and having inner and outer circumferential surfaces;

light generating means at least partially embedded in said sleeve between said inner and said outer circumferential surfaces at a front end of said sleeve;

an inductive coil imbedded at least partially in said sleeve generally between said inner and said outer surfaces, proximate said magnet for generating an electric current from said magnetic field; and, electrical conductors routed through said sleeve between said inner and said outer circumferential surfaces for supplying said electric current from said current generating means to said lighting means.

25. The attachment as defined in claim 24 wherein said lighting means is at least one light emitting diode (LED).

26. The power tool as defined in claim 24 wherein said magnet is substantially in a shape of a ring.

27. The power tool as defined in claim 26 wherein an inner opening of said magnet is matingly attached to an outer surface of a nut that has an inner surface which is configured and adapted to be threadably secured to the tool holder.

28. The power tool as defined in claim 27 wherein said nut extends beyond said magnet in an axial direction of said magnet.

29. A light source apparatus for an extension attachment adapted to be removably and operatively connected to a rotary power and having a rotatable tool holder extending from a distal end of the attachment, said attachment comprising:

a magnet constructed and adapted to be removably secured to the tool holder;

a generally tubular electrically nonconductive sleeve configured and adapted to be removably attached to the distal end of the attachment, said sleeve having inner and outer circumferential surfaces;

an inductive coil at least partially imbedded in said sleeve generally between said inner and said outer circumferential surfaces and positioned proximate said magnet when said sleeve is attached to the attachment, for generating an electric current from an alternating magnetic field created by said magnet when the extension attachment is operated; and, light generating means at least partially embedded in said sleeve between said inner and said outer surfaces at a front end of said sleeve, and being adapted to illuminate when supplied with said electric current from said inductive coil; and, electrical conductors routed through said sleeve between said inner and said outer circumferential surfaces for supplying said electric current from said inductive coil to said lighting means.

30. The apparatus as defined in claim 29 wherein said lighting means is at least one light emitting diode (LED).

31. The apparatus as defined in claim 29 wherein said magnet is substantially in a shape of a ring.

32. The power tool as defined in claim 31 wherein an inner opening of said ring is matingly attached to an outer surface of a nut that has an inner surface which is configured and adapted to be threadably secured to the tool holder.

33. The power tool as defined in claim 32 wherein said nut extends beyond said magnet in an axial direction of said magnet.

* * * * *